United States Patent [19]

Cusato, Jr.

[11] 4,302,330

[45] * Nov. 24, 1981

[54] FILTER APPARATUS WITH CLEANING FUNCTION

[76] Inventor: John Cusato, Jr., 1902 Surrey Rd., Oreland, Pa. 19075

[*] Notice: The portion of the term of this patent subsequent to May 27, 1997, has been disclaimed.

[21] Appl. No.: 99,989

[22] Filed: Dec. 3, 1979

Related U.S. Application Data

[63] Continuation-in-part of Ser. No. 7,965, Jan. 31, 1979, Pat. No. 4,204,961, which is a continuation-in-part of Ser. No. 886,680, Mar. 15, 1978, abandoned.

[51] Int. Cl.³ .............................................. B01D 35/16
[52] U.S. Cl. .................................... 210/107; 210/112; 210/138; 210/232; 210/444
[58] Field of Search ............... 210/452, DIG. 17, 391, 210/138, 111, 112, 107, 448, 444, 232; 55/304

[56] References Cited

U.S. PATENT DOCUMENTS

| | | | |
|---|---|---|---|
| 2,183,616 | 12/1939 | Korte | 210/452 X |
| 3,332,554 | 7/1967 | Humbert, Jr. | 210/DIG. 17 |
| 3,502,213 | 3/1970 | Kuribayashi | 210/138 X |
| 4,204,961 | 5/1980 | Cusato, Jr. | 210/391 X |

*Primary Examiner*—Frank A. Spear, Jr.
*Attorney, Agent, or Firm*—Raymond Underwood

[57] ABSTRACT

A fluid filter apparatus has a standard filter element in it which has the usual end gaskets seated in annular grooves. An axial drive shaft positively rotates the filter element through key-like means between the shaft and the wall of a groove. An automatic system starts and stops the rotation.

6 Claims, 2 Drawing Figures

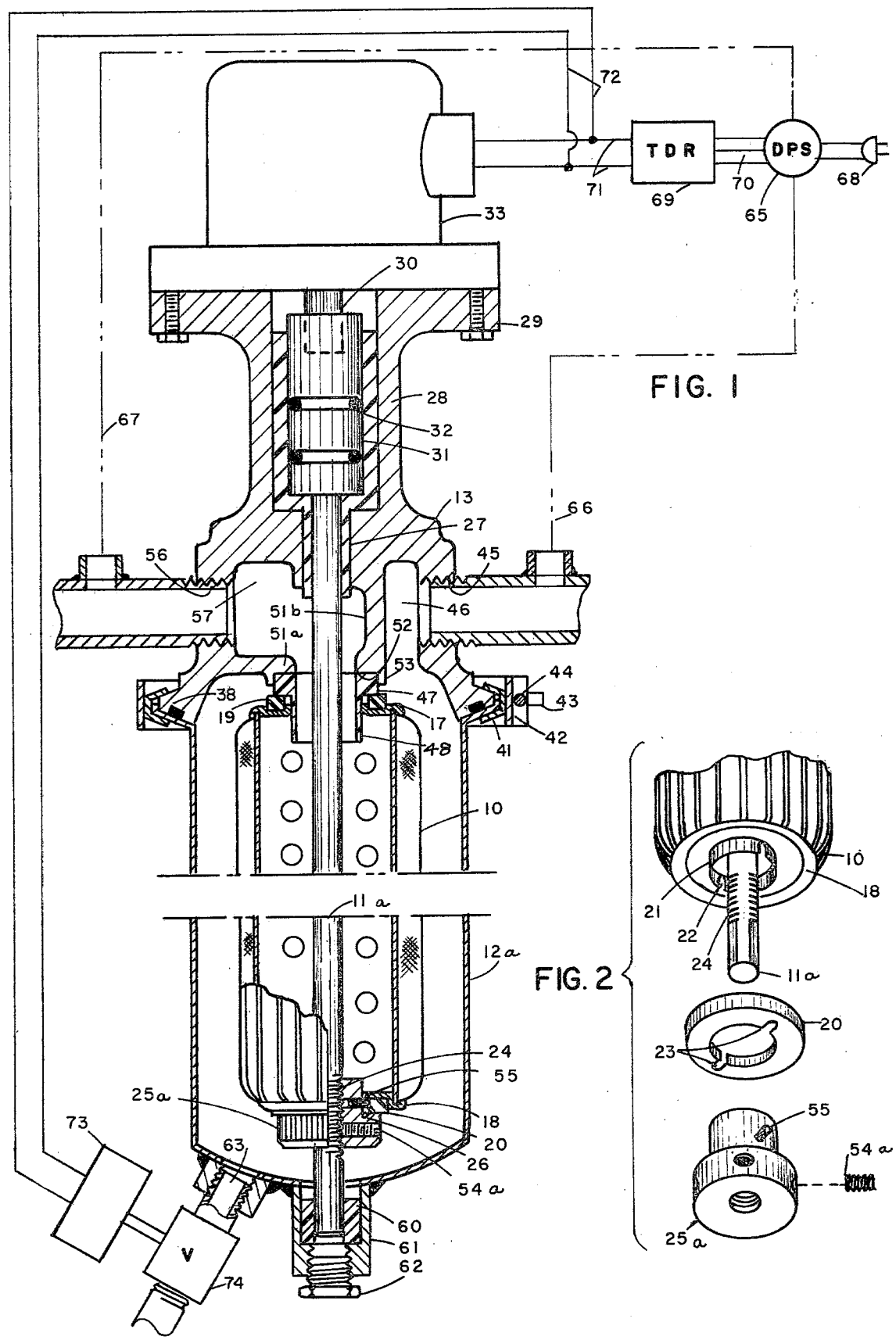

FILTER APPARATUS WITH CLEANING FUNCTION

This is a continuation in part application of my co-pending application Ser. No. 7,965 filed on Jan. 31, 1979, now U.S. Pat. No. 4,204,961, which in turn is a continuation in part of my parent application Ser. No. 886,680 filed on Mar. 15, 1978; now abandoned, both having the same title of this application.

This invention relates to fluid filters and particularly to filter apparatus which provides for the rotation of a cylindrical filter element about its axis to centrifugally throw off the debris which has been filtered out of the fluid and has collected on the outside of the filter element. Also, the invention includes the automatic control system for initiating the rotation of the filter.

The fluid filter disclosed herein embodies features which are improvements on the structures disclosed in my patent application Ser. No. 7,965 which matured into U.S. Pat. No. 4,204,961. The structure of that patent functions in an excellent manner if it is assembled by a careful workman. However, it has been found that if the nut 25 or 25a of the patent has not been fully screwed on according to directions, there is not a sufficient frictional drive between it and the gasket with the result that the filter element is not rotated at full speed. On the other hand, if this nut is screwed on too far there will be an excessive frictional drag between the washer 49 and the bushing 50 which will exert a braking action on the rotation of the filter element.

One feature of the present invention is the provision of a positive drive connection between the nut 25 or 25a and the filter gasket 20 so that less care is required in effectively screwing it in place. This direct drive connection makes sure that the filter element is driven at the full rotational speed of the drive shaft even if the nut 25 or 25a is somewhat too firmly or too loosely pressed against the filter gasket 20.

Other features of the present invention are the several improvements which have made in the structure of my patent as will appear from the drawings and the following description. Moreover, a representative control system of the types described in my earlier applications Ser. Nos. 7,965 and 886,680 is illustrated and described herein. This control system automatically starts the rotation of the filter element when it becomes dirty and rotates it for a predetermined time period.

In the accompanying drawings:

FIG. 1 is a longitudinal, sectional view through the axis of a preferred embodiment of the invention, a portion at the center being removed and a schematic representation of the control system being shown and, FIG. 2 is an exploded view in perspective of the lower end of the filter element.

Since most of the structural parts of the present filter are the same as the corresponding ones in Ser. No. 7,965 a detailed explanation of them will not be repeated here and consequently the disclosure of that earlier application is hereby incorporated herein by this reference. For this reason the same reference numerals have been used when this applies. In like manner the general references in Ser. Nos. 7,965 and 886,680 to the automatic operation of the system are hereby incorporated herein as a basis for the schematic illustration and description in this application.

The filter element 10 is a standard, commercial one as is explained in my earlier applications and it includes the fixed top disc 17 and the fixed lower disc 18. Both discs are annularly recessed or cupped outwardly to receive and retain the ring gaskets 19 and 20 respectively. These gaskets usually come with the filter element and they are made of rubber or rubber-like synthetic material which is somewhat yieldable and provides a frictional surface.

The present invention uses the same commercial filter element but requires that minor changes be made in it to adapt it to the present improvement. The above mentioned outward cupped shape of the end discs 17 and 18 is formed in part, by the short sleeve 21 shown in FIG. 2. This is the inner wall of the annular channel or cup which receives the gasket 20. The present invention requires that this sleeve be notched as shown at 22 in FIG. 2, and this is easily accomplished with a file, or a fine toothed saw, for instance since this sleeve is fully exposed when the gasket is temporarily removed.

Also, the invention requires that the gasket 20 be notched as shown at 23 in FIG. 2 and this is easily accomplished with a knife or a coarse file. One notch 22 and one notch 23 are sufficient but the two separate notches shown may facilitate assembly. The notch 22 serves as a key-way to drive the filter element as will be explained.

The filter element 10 with its gaskets 19 and 20, is carried on the shaft 11a having the hub-like enlargement 31. The top of the shaft is bearinged in the sleeve bearing 27 and its extension having the enlarged bore 28. The O-rings 32 prevent fluid leakage past the shaft. The shaft 30 of motor 33 is keyed into the top of shaft 11a and the motor is affixed to the motor flange 29.

The lower end of the shaft 11a turns in a bearing 60 which is firmly held in the depending tubular extension 61 of the shell housing 12a. A plug 62 is threaded into this extension 61. This lower bearing 60 may be omitted if experience shows that without it the shaft 11a does not wobble too much during rotation.

The shell 12a is clamped against the housing head 13 by means of the clamping ring 41–42 and the bolt and handle 43–44 as is explained in Ser. No. 7,965. The gasket 38 at the meeting faces assures a fluid tight seal.

The filter element 10 is held up in place on the shaft 11a by means of the nut 25a which screws on the threads 24 on the shaft. The nut 25a is retained in its adjusted position by means of the set screw 54a. The nut 25a is screwed on at least until its annular rib 26 bears against the gasket 20 sufficiently to form a liquid tight seal.

As a feature of the invention, the nut 25a is provided with a radially extending pin 55 and if desired another, diametrically opposed pin may be provided. This pin 55 is so disposed that it will pass through a notch 23 in gasket 20 and will engage in a notch 22 of the filter sleeve 21. The pin 55 therefore serves the purpose of a key between the shaft 11a and the filter element. As the pin is affixed to the nut 15a and the nut is secured to the shaft 11a by the set screw 54a there is a fixed, positive rotational drive of the filter element through its notch 22.

The head 13 has a threaded inlet port 45 which communicates with an internal inlet chamber 46 which opens downwardly into the space between the shell 12a and the outside of the filter element. The head also has the outlet threaded port 56 which communicates with the outlet chamber 57 which is separated from the inlet chamber 46 by the internal partition 51a–51b.

This partition 51a–51b has a hole through it which is surrounded by the bearing surface 52 which is in a plane perpendicular to the axis of shaft 11a. This bearing surface is provided by the material of the head 13. Located between this bearing surface 52 and the gasket 19 is a bearing bushing 47 and it has a depending skirt 48 which fits the hole in the disc 17 to center it. This bushing 47 is centered on the bearing surface 52 by a surrounding cylindrical ridge 53.

The frictional surface of the gasket 19 carries with it the bushing 47 which then turns on the surface 52. The material of the bushing 47 must be non-galling relative to the material of surface 52 as will be explained.

The filter element is assembled on the drive shaft when the lower shell, of course is removed from the head. The nut 25a is tightened up sufficiently to form a fluid tight seal with the lower gasket 20 and this will bring the top gasket 19 in a fluid tight seal against the bushing 47; this will also form a fluid tight seal between the bushing 47 and the bearing surface 52. After the shell 12a is affixed to the head 13 dirty fluid can be forced in the inlet 45 and cleaned fluid will be delivered out of the outlet 56. When the filter element is dirty, the fluid flow is stopped, the dirt outlet at 63 is opened and the motor 33 is energized. This will throw the dirt off of the filter element and it will escape through the outlet 63.

The automatic control system which is mentioned in my earlier applications is illustrated here in a schematic manner. The differential pressure switch 65 receives the inlet supply pressure through the tubing 66 and the outlet pressure through the tube 67. The switch is adjustable so that when the filter element starts to plug up with dirt the resultant high inlet pressure will trigger the switch to connect the electrical supply source at 68 to the time delay relay 69 through the connecting wires 70.

When the relay 69 is so activated it will supply electricity to the wires 71 for the predetermined time period for which the relay has been set. The relay 69 will supply electricity to wires 71 for this present time period even though the switch 65 opens. The relay 69 resets itself after each "on" period, in readiness for the next impulse from the differential switch 65.

The electricity from wires 71 is delivered to the motor 33 and also through the branch wires 72 to the solenoid 73 which opens the valve 74. As valve 74 is in the dirt outlet 63 line the dirt which is thrown off of the spinning filter element is sent out of the filter shell.

A spinning period of a few seconds up to 30 seconds will generally suffice to centrifugally throw off the filter dirt and during this short time very little fluid will be lost through the open valve 74. It should be noted that this spin-cleaning eliminates the requirement for a reverse flow through the filter.

A suitable material for the head 13 is stainless steel and the bushing, to be non-galling, may be made of brass, carbon block such as that of motor brushes, or a plastic such as Teflon or Celcon. The selection will depend on the chemical nature of the fluid so as to avoid incompatibility.

A suitable differential pressure switch is Mercoid type DPA-33 and a suitable time delay relay is Agasat type Ag-2422. The valve 74 may be of the solenoid type such as Asco 8210C94 or of the ball type such as Jamesbury 2200. The valve may be operated by compressed air in which case the electricity from wires 72 would open an air valve.

Numerous other variations are possible within the scope of the invention. Instead of the bushing 47–48 it is possible to substitute the bearing elements 49 and 50 of my patent, having in mind that the surface at 52 hereof must be suitably machined. In other words, the structure of my patent may be used and only the changes shown in FIG. 2 hereof to obtain the positive filter drive may be made. Other changes are obvious such as the use of an air motor instead of the electric motor 33, or the substitution of a collar and its set screw for the nut 25a.

I claim:

1. A fluid filter apparatus which comprises:
   a housing forming an enclosed space and having an inlet opening and an outlet opening,
   a filter element in said enclosed space of hollow cylindrical form with a projecting sleeve at both ends defining an inner wall of an annular groove which surrounds the opening at both ends, at least one sleeve having a notch therein,
   a gasket positioned in each groove,
   a shaft rotatably mounted in the housing and passing therethrough and located at the axis of the filter,
   a partition within the housing separating the inlet and the outlet openings and directing fluid from the inlet opening to the exterior of the filter element, said partition having an opening therethrough which communicates with an end opening of the filter element so fluid from the hollow interior flows to the outlet opening,
   an annular bearing element of a material of construction which is non-galling relative to the material of construction of the partition and which is disposed between the partition at its opening and the gasket at the communicating end opening of the filter element,
   said material of construction of said bearing element also being frictionally drivable by the material of construction of said gasket when said shaft is rotated and frictionlessly bearing on the partition to form a relatively free slippage area between them,
   and key means between the shaft and said notch in the projecting sleeve of the filter element to positively rotate the latter by the shaft.

2. The apparatus of claim 1 in which said key means comprises a pin operatively connected to the shaft and projecting into said notch.

3. The apparatus of claim 1 in which said shaft is threaded and a nut is on the screw threads and said key means includes a pin carried by the nut and projecting into said notch.

4. The apparatus of claim 1 in which said bearing element bears directly on the material of said partition.

5. The apparatus of claim 1 which additionally includes an automatic control system comprising a differential pressure switch which is triggered by the difference in pressures at the inlet and the outlet, a time delay relay which delivers electricity for a preset time when it is triggered by the differential pressure switch and a drive motor and a dirt outlet valve which are electrically activated by the time delay relay.

6. A filter element comprising an elongated hollow cylindrical filter body having an axial passageway therethrough and a disc firmly affixed at both open ends thereof and which is cupped outwardly to form a gasket receiving annular groove, a projecting sleeve of the disc defining a central hole through the disc and also the inner wall of said annular groove, at least one of said sleeves having a notch therein whereby a rotational drive at the notch of the disc will drive with it the affixed filter body to thereby also rotate the filter body.

* * * * *